United States Patent
Ernst et al.

(10) Patent No.: US 10,815,931 B2
(45) Date of Patent: Oct. 27, 2020

(54) WASTE HEAT RECOVERY SYSTEM WITH LOW TEMPERATURE HEAT EXCHANGER

(71) Applicant: Cummins Inc., Columbus, IN (US)

(72) Inventors: Timothy C. Ernst, Columbus, IN (US); Christopher R. Nelson, Columbus, IN (US)

(73) Assignee: Cummins Inc., Colombus, IN (US)

( * ) Notice: Subject to any disclaimer, the term of this patent is extended or adjusted under 35 U.S.C. 154(b) by 124 days.

(21) Appl. No.: 15/841,952

(22) Filed: Dec. 14, 2017

(65) Prior Publication Data

US 2019/0186415 A1 Jun. 20, 2019

(51) Int. Cl.
| | |
|---|---|
| *F01N 3/02* | (2006.01) |
| *F02G 5/04* | (2006.01) |
| *F02G 1/047* | (2006.01) |
| *F02M 26/33* | (2016.01) |
| *F02M 26/24* | (2016.01) |
| *F01N 5/02* | (2006.01) |
| *F02M 26/11* | (2016.01) |
| *F28F 21/08* | (2006.01) |

(52) U.S. Cl.
CPC ............ *F02G 5/04* (2013.01); *F01N 3/0205* (2013.01); *F01N 5/02* (2013.01); *F02G 1/047* (2013.01); *F02M 26/24* (2016.02); *F02M 26/33* (2016.02); *F01N 2240/02* (2013.01); *F01N 2410/00* (2013.01); *F01N 2900/1404* (2013.01); *F02M 26/11* (2016.02); *F28F 21/083* (2013.01); *Y02T 10/16* (2013.01); *Y02T 10/20* (2013.01)

(58) Field of Classification Search
CPC ........... F02G 5/04; F02G 1/047; F02M 26/24; F02M 26/33; F02M 26/11; F01K 15/02; F01K 23/065; F01N 2240/02; Y02T 10/20; Y02T 10/16
USPC .................... 123/676; 60/300, 307, 320–324
See application file for complete search history.

(56) References Cited

U.S. PATENT DOCUMENTS

| | | | |
|---|---|---|---|
| 3,635,276 A | 1/1972 | Green et al. | |
| 7,422,054 B2 | 9/2008 | Dierbeck | |
| 7,464,700 B2 * | 12/2008 | Kolb ..................... | F28D 1/0435 |
| | | | 123/563 |
| 7,640,731 B2 * | 1/2010 | Huang ................... | F01N 3/031 |
| | | | 60/274 |
| 8,061,334 B2 | 11/2011 | Eitel et al. | |
| 8,635,871 B2 | 1/2014 | Ernst et al. | |
| 8,752,378 B2 | 6/2014 | Ernst et al. | |
| 9,657,602 B2 * | 5/2017 | Kawai ...................... | F02G 5/02 |
| 9,909,541 B1 * | 3/2018 | Bevan .................... | F02M 26/15 |
| 10,287,923 B2 * | 5/2019 | Tricaud ................. | F01K 23/065 |

(Continued)

FOREIGN PATENT DOCUMENTS

WO WO2011029940 3/2011

*Primary Examiner* — Hai H Huynh
*Assistant Examiner* — Gonzalo Laguarda
(74) *Attorney, Agent, or Firm* — Taft Stettinius & Hollister LLP (57) ABSTRACT

Systems and methods are disclosed to recover waste heat from an engine fluid with a heat exchanger subsystem that includes a heat exchanger. The heat exchanger subsystem is thermally coupled to a working fluid and the engine fluid, so the waste heat from the engine fluid is transferred to the working fluid. The engine fluid is bypassed from the heat exchanger in response to a heat exchanger bypass condition.

18 Claims, 5 Drawing Sheets

(56) References Cited

U.S. PATENT DOCUMENTS

| | | | |
|---|---|---|---|
| 2011/0209473 A1* | 9/2011 | Fritz | F01K 23/065 60/605.2 |
| 2012/0023946 A1* | 2/2012 | Ernst | F01K 9/04 60/660 |
| 2012/0043063 A1* | 2/2012 | Schatz | F28D 9/0031 165/157 |
| 2012/0102918 A1* | 5/2012 | Smith | F01N 3/023 60/273 |
| 2013/0019847 A1* | 1/2013 | Nelson | F02G 5/02 123/568.12 |
| 2013/0220130 A1* | 8/2013 | Ihms | F01N 5/025 96/329 |
| 2016/0214465 A1* | 7/2016 | Zhou | F01K 23/065 |
| 2016/0250908 A1* | 9/2016 | Nakashima | B60H 1/025 165/51 |
| 2017/0218865 A1* | 8/2017 | Styles | F02M 26/06 |

* cited by examiner

WASTE HEAT RECOVERY SYSTEM WITH LOW TEMPERATURE HEAT EXCHANGER

FIELD OF THE INVENTION

The present invention relates to waste heat recovery systems, and more particularly, to waste heat recovery from engine fluids using a low temperature heat exchanger.

BACKGROUND

Operation of current and future vehicles tend to have reduced engine fluid temperatures due to engine efficiency improvements, electrification, and lower required vehicle loads due to aerodynamic drag and rolling resistance reductions. The reduced engine fluid temperatures may provide a higher fraction of operational time when the engine fluid temperature is within a thermal capability of certain materials that have not heretofore been used in conjunction with the engine fluid.

For example, vehicle waste heat recovery (WHR) systems use a heat exchanger thermally coupled to an engine fluid and a working fluid. A typical heat exchanger includes a boiler that requires high temperature operation capabilities to enable heat extraction across the range of engine operating conditions. This requirement generally dictates the use of stainless steel or similarly thermally capable material to enable high temperature operation without corroding and/or mechanically failing. Using such materials drives up the cost substantially compared to other materials that are less thermally capable and therefore are not practicable in current systems. However, as discussed above, the fraction of operational time in which these highly thermally capable materials are required for certain vehicles and engine operating conditions is being reduced. Therefore, further improvements in this technology are needed.

SUMMARY

The present disclosure includes a method of recovering a waste heat from an engine fluid with a heat exchanger subsystem that includes a heat exchanger. The heat exchanger subsystem is thermally coupled to a working fluid and the engine fluid, so the waste heat from the engine fluid is transferred to the working fluid. The engine fluid is bypassed around the heat exchanger in response to a heat exchanger bypass condition. The engine fluid may be one of an engine exhaust, a recirculated exhaust gas, a coolant, an engine oil, and a charge air, for example.

The heat exchanger may be constructed of a material that lacks thermal capability to operate effectively in response to engine fluid above a predetermined threshold. This material may be an aluminum material in one embodiment, but other materials are not precluded, such as ferritic stainless steel or a combination of stainless steel and aluminum. If the engine fluid meets a bypass condition, for example, exceeding a temperature threshold associated with the thermal capability of the heat exchanger, the engine fluid may be bypassed by positioning of a bypass valve upstream of the heat exchanger.

The heat exchanger subsystem may include, in one embodiment, a low temperature section and a high temperature section upstream of the low temperature section. The high temperature section may be constructed of a first material capable of higher temperature operation than a second material that comprises the low temperature section. The heat exchanger subsystem may also include air cooling of the engine fluid upstream of the low temperature section and/or upstream of the high temperature section of the heat exchanger subsystem.

There is also disclosed a heat exchanger subsystem that may be configured to receive a waste heat from an engine fluid, and the heat exchanger subsystem includes a heat exchanger configured to thermally couple a working fluid and the engine fluid to recover the waste heat. A bypass valve may be configured to bypass the engine fluid around the heat exchanger in response to a bypass condition.

The bypass condition may include, for example, one or more of an engine fluid temperature being greater than a first predetermined threshold and the engine fluid being less than a second predetermined threshold. The bypass condition may also or alternatively include at least one of a flow rate of the working fluid being less than a threshold amount and a faulted state of the working fluid system.

The heat exchanger subsystem may include a low temperature heat exchanger and a high temperature heat exchanger upstream of the low temperature heat exchanger. The high temperature heat exchanger may be configured to reduce the engine fluid temperature upstream of the low temperature heat exchanger.

The heat exchanger subsystem may include an air mixer configured to cool the engine fluid upstream of the heat exchanger. The air mixer may include at least one of a fan, an air injector, and an air entrainment device. The air mixer may be included with the bypass valve.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present disclosure includes vehicle waste heat recovery (WHR) systems that use a heat exchanger subsystem having a heat exchanger thermally coupled to an engine fluid and a working fluid. In certain embodiments, the engine fluid is bypassed from the heat exchanger when the temperature of the engine fluid is greater than a first predetermined threshold, is less than a second predetermined threshold, and/or falls outside of a predetermined temperature range, to enable the use of material or materials for the heat exchanger that are less thermally capable than, for example, stainless steel. For example, aluminum is lightweight and has good heat transfer capabilities. Aluminum alloys have been developed that can handle the potentially corrosive environment of engine fluid. Therefore, aluminum or other similarly thermally capable materials may be employed with the heat exchanger of the waste heat recovery systems disclosed herein due to the presently disclosed systems and methods that prevent the use of the heat exchanger during unsuitable conditions.

Figure 1:
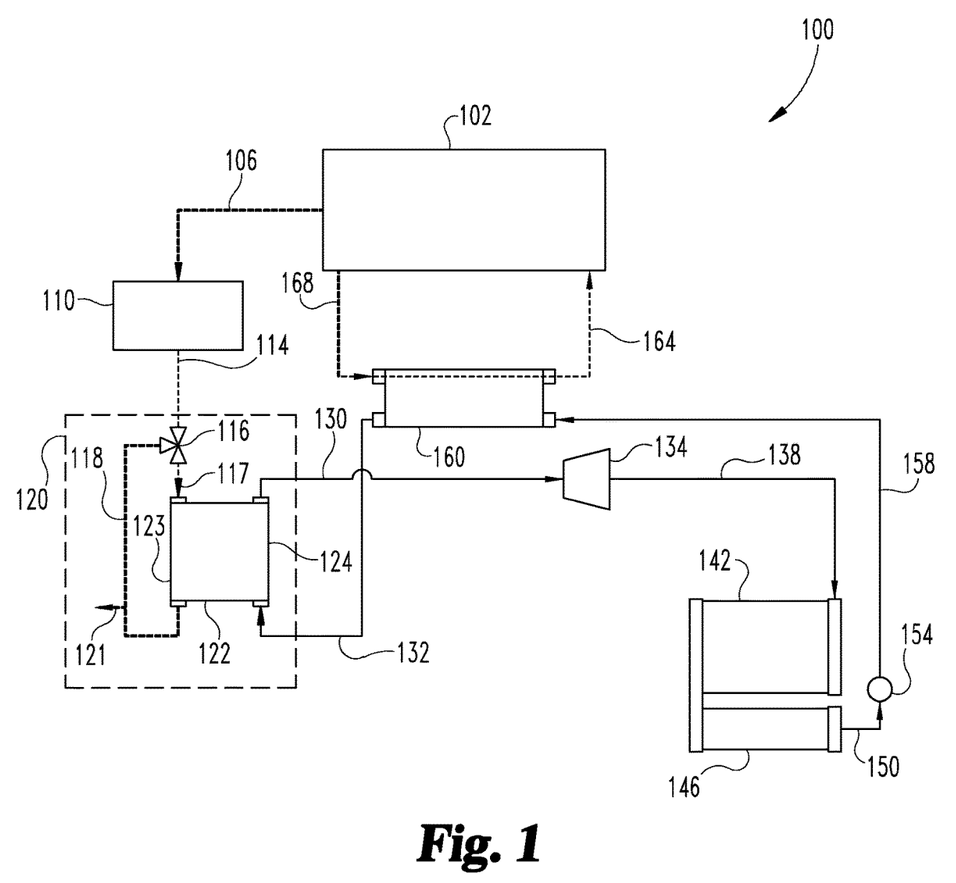
FIG. 1 is a vehicle/engine waste heat recovery system with a bypass valve upstream of a heat exchanger.

FIG. 1 discloses an embodiment of a waste heat recovery system 100. The waste heat recovery system 100 includes a heat exchanger subsystem 120, an engine 102, an aftertreatment component(s) 110, an engine heat exchanger 160, an expander 134, a condenser 142, a sub-cooler 146, a pump 154, a plurality of engine fluid passageways, and a plurality of working fluid passageways. The heat exchanger subsystem 120 includes an exhaust heat exchanger 122, a bypass valve 116 upstream of the exhaust heat exchanger 122, and a plurality of fluid passageways. The engine 102 is fluidly coupled to both aftertreatment component 110 and the engine heat exchanger 160. The engine fluid flows from engine 102 to engine fluid passageway 106 to aftertreatment component 110. The engine fluid flows from the aftertreatment component 110 to fluid passageway 114 upstream of the bypass valve 116.

If temperature of the engine fluid entering bypass valve 116 meets a bypass condition, the exhaust heat exchanger 122 is bypassed by positioning of bypass valve 116 to direct exhaust flow away from exhaust heat exchanger 122. The bypass valve 116 has at least two positions, a first position to bypass the engine fluid around the heat exchanger 122, and a second position to not bypass heat exchanger 122 and allow the engine fluid to pass through exhaust heat exchanger 122. In the first position the engine fluid flows from bypass valve 116, to engine fluid bypass passageway 118, to engine fluid passageway 121 to exit the heat exchanger subsystem 120. If the temperature of the engine fluid entering bypass valve 116 does not meet a bypass condition, the bypass valve 116 moves to a second position allowing the engine fluid to flow in engine fluid passageway 117 and through a first side 123 of exhaust heat exchanger 122. The engine fluid flows through the exhaust heat exchanger 122 and out of the heat exchanger subsystem 120 through passageway 121.

The exhaust heat exchanger 122 includes a second side 124 fluidly coupled to a working fluid that flows through the heat exchanger 122 from working fluid passageway 132, to the exhaust heat exchanger 122, to working fluid passageway 130. The working fluid then flows to expander 134, before flowing through working fluid passageway 138. Working fluid passageway 138 sends the working fluid into the condenser 142, followed by sub-cooler 146. After the sub-cooler 146 the working fluid flows to working fluid passageway 150, which feeds pump 154 sending working fluid through passageway 158 into the engine heat exchanger 160. Heat from another working fluid of engine 102 can be circulated to engine heat exchanger 160 from flow path 168 and from engine heat exchanger 160 back to engine 102 through flow path 164. The cycle repeats as the working fluid flows to working fluid passageway 132 to provide the working fluid to exhaust heat exchanger 122 in series with engine heat exchanger 160. Other embodiments contemplate other arrangements for the waste heat recovery systems disclosed herein.

In the illustrated embodiment, heat exchanger subsystem 120 receives an engine fluid that is engine exhaust. In the illustrated embodiment, the exhaust heat exchanger 122 is a boiler and the passageway 121 is an exhaust stack. However, other forms for heat exchanger 122 other than a boiler are contemplated, and the engine fluid need not be an exhaust. In addition, the engine heat exchanger 160 can be omitted or provided in a parallel relationship with heat exchanger subsystem 120, and/or other heat exchangers can be provided.

Figure 2:
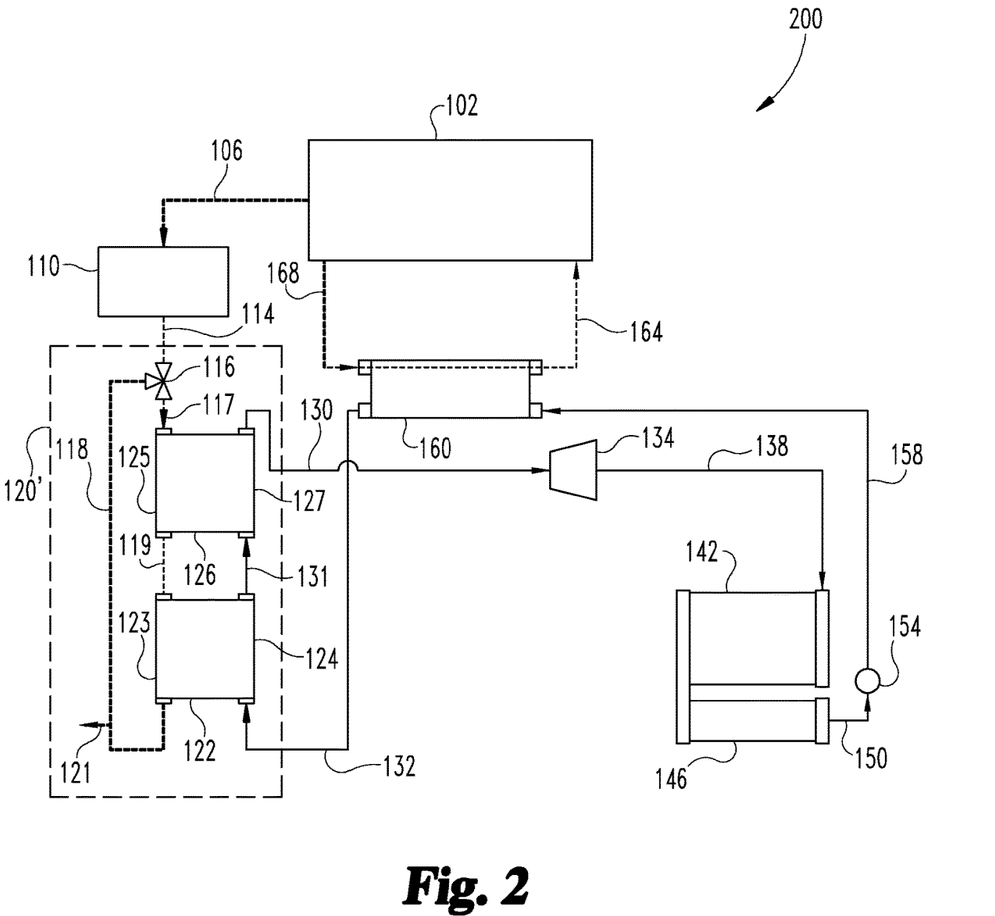
FIG. 2 is a vehicle/engine waste heat recover system with a bypass valve and a high temperature heat exchanger upstream of the heat exchanger.

FIG. 2 is another embodiment of a waste heat recovery system 200. The system 200 includes the same elements as the system 100 except the heat exchanger subsystem 120', which includes an additional higher temperature heat exchanger 126 upstream of and more temperature capable than the heat exchanger 122. Elements of system 200 that are like elements of system 100 are designated with the same reference numerals. The function of the bypass valve 116 in heat exchanger subsystem 120' is same as heat exchanger subsystem 120. The engine fluid can bypass at least a part of the heat exchanger subsystem 120' if a bypass condition is present. In the illustrated embodiment, bypass valve 116 is upstream of both the higher temperature heat exchanger 126 and the downstream heat exchanger 122. The engine fluid flows from engine fluid passage way 114 downstream of the aftertreatment component 110 and flows to bypass valve 116. Optionally, bypass valve 116 may be positioned downstream of the higher temperature heat exchanger 126, coupled to engine fluid passageway 119, and upstream of low temperature heat exchanger 122, or in both positions, a first bypass valve upstream of higher temperature heat exchanger 126, coupled to passage way 117 and a second bypass valve upstream of heat exchanger 122, coupled to passageway 119 (not shown).

In the embodiment of system 200, the upstream higher temperature heat exchanger 126 can be provided to lower the temperature of the engine fluid and extract a first portion of the heat before it is provided to the lower temperature capability heat exchanger 122. However, the upstream higher temperature heat exchanger 126 can be smaller in size and reduced in capacity in comparison to a system that includes a single high temperature heat exchanger since the higher temperature heat exchanger 126 need only extract a small portion of the heat from the engine fluid that is above a predetermined temperature threshold, allowing the downstream, less expensive heat exchanger 122 to extract the remaining available waste heat. The system 200 allows a higher predetermined temperature threshold to be employed than system 100 before bypassing the heat exchanger subsystem 120' since upstream higher temperature heat exchanger 126 removes a part of the heat before it is provided to heat exchanger 122.

An embodiment of the heat exchanger subsystem 120' may include a small high temperature section of the heat exchanger ahead of a larger low temperature section. The sections may be part of the same heat exchanger or boiler, or separate devices. The high temperature section may be made of stainless steel or other materials that are capable of high temperature operation and may bring the exhaust temperature down to a usable range for the low temperature section. Additionally, both sections may be mounted vertically with respect to engine fluid flow so that any condensation is allowed to gravity drain out of the heat exchanger core (not shown) and reduce the chances of corrosion.

Figure 3:
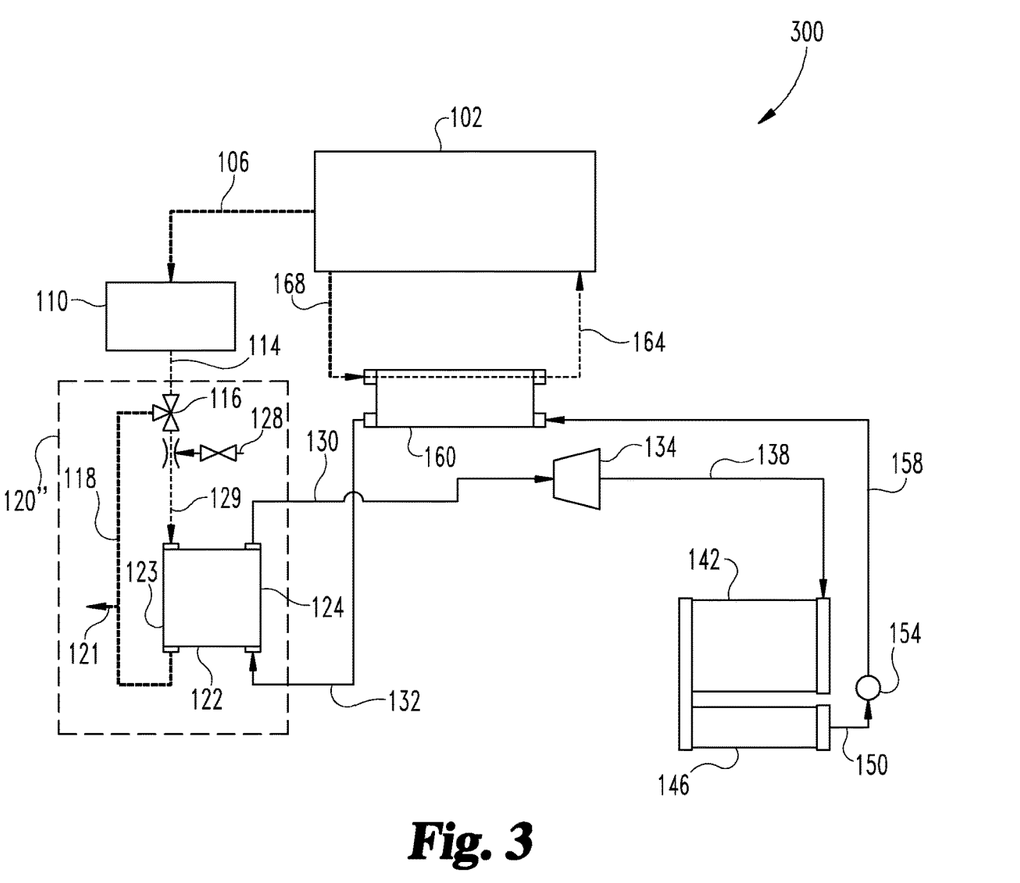
FIG. 3 is a vehicle/engine waste heat recover system with a bypass valve and an air mixer upstream of the heat exchanger.

FIG. 3 is another embodiment of a waste heat recovery system 300. The waste heat recovery system 300 may include the same elements as the system 100 with exception to the heat exchanger subsystem 120", and like elements are designated with the same reference numerals as system 100. The bypass valve 116 operation is the same as heat exchanger subsystem 120 discussed above. The engine fluid bypasses the heat exchanger 122 if a bypass condition is present. The heat exchanger subsystem 120" includes an air mixer 128 upstream of exhaust heat exchanger 122. If system conditions are met, the engine fluid passes through bypass valve 116 and is combined with air provided by air mixer 128 prior to entering the exhaust heat exchanger 122. The cooling air provided by air mixer 128 cools the engine fluid upstream of the exhaust heat exchanger 122, increasing the operating range at which heat exchanger subsystem 120" can be employed since the engine fluid can be cooled to a suitable operating temperature upstream of exhaust heat exchanger 122.

Various embodiments of air mixer 128 are contemplated. In one embodiment, the air mixer includes at least one of a fan, an air injector, and an air entrainment device. A venturi device can be provided at the mixing location to improve the entrainment of air into the engine fluid. Air cooling of the engine fluid may be accomplished via multiple direct heat transfer methods and devices. For example, the air mixer 128 can provide air entrainment via ejector using exhaust as the motive fluid and air as the suction fluid. The suction air could also include a valve to prevent air from being entrained when not desired. The air mixer 128 can provide forced air flow using a small fan or compressed air from the vehicle injected into engine fluid stream. The bypass valve 116 could also incorporate the air mixing features described. Indirect cooling of the engine fluid may also be accomplished by an air mixer 128 such as electric fan blowing air on external side of engine fluid passageway to cool the engine fluid. The engine fluid passageway could also have extended surfaces to enhance heat transfer. An air mixer 128 such as electric fan blowing air through an air-to-engine fluid heat exchanger upstream of the heat exchanger 122 is also contemplated. An air mixer 128 can also be provided with heat exchanger subsystem 120'.

Figure 4:
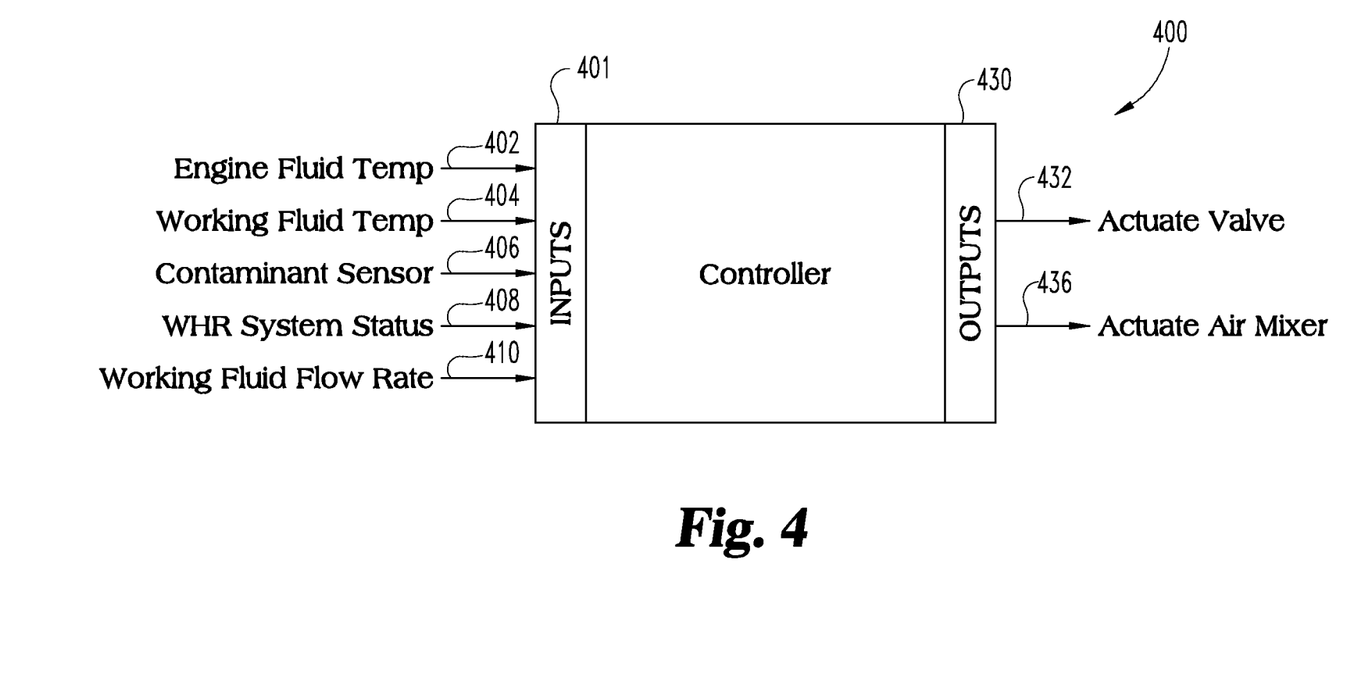
FIG. 4 is one embodiment of a controller apparatus for operating the waste heat recovery system of the present disclosure.

FIG. 4 is an example of an embodiment of a controller apparatus 400 for controlling operation of one or all of heat exchanger subsystems 120, 120' and 120". The inputs 401 to controller 400 may include engine fluid temperature signal 402 for the engine fluid temperature upstream of heat exchanger 122, heat exchanger 122 working fluid inlet temperature signal 404 for a temperature of the working fluid, an engine fluid contaminant amount signal 406 indicative of an amount of contaminant in the engine fluid, a waste heat recovery status signal 408, and a flow rate of working fluid signal 410. This list is not limiting and other inputs to controller 400 are also contemplated. The outputs 430 of controller 400 may include a bypass valve position signal 432 to direct the engine fluid flow through heat exchanger 122 or away from heat exchanger 122, and an air mixer signal 436 to initiate or terminate providing air injection for cooling the engine fluid. Other outputs from controller 400 are also contemplated.

In one embodiment, the bypass valve position signal 432 is provided to bypass the heat exchanger 122 in response to a temperature condition of the engine fluid provided by the engine fluid temperature signal 402. The temperature condition can be a high temperature threshold to prevent engine fluid having a temperature that is potentially damaging to the materials of heat exchanger 122 from passing through heat exchanger 122. The temperature condition can also be a low temperature threshold to prevent engine fluid having a temperature that is too low and potentially causative of condensation and subsequent corrosion in heat exchanger 122 from passing through heat exchanger 122. In a further embodiment, the air mixer signal 436 is provided to air mixer 128 to provide air for cooling the engine fluid in response to a temperature condition of the engine fluid provided by engine fluid temperature signal 402. The working fluid inlet temperature signal 404 may also be used to provide engine fluid flow to or bypass engine fluid flow from heat exchanger 122 in response to the working fluid inlet temperature.

In another embodiment, the bypass valve position signal 432 is provided in response to an engine fluid contaminate amount in the engine fluid being more than a threshold to protect the heat exchanger 122 from corrosion or other conditions. For example, if the engine fluid is an exhaust fluid, a contaminant such as an ammonia amount can be detected and the heat exchanger 122 is bypassed from the engine fluid to limit or prevent potential damage due to the presence of ammonia.

In another embodiment, the bypass valve position signal 432 is provided in response to the waste heat recovery status signal 408 indicating a fault condition to bypass the engine fluid from the heat exchanger 122. In another embodiment, the bypass valve position signal 432 is provided to bypass the engine fluid from the heat exchanger 122 in response to the working fluid signal 410 indicating a low flow rate for the working fluid.

A low-temperature and low-cost waste heat recovery system may include a heat exchanger 122 constructed of low cost materials such as aluminum (or others) which may not have as high of a temperature capability as other more expensive materials, such as stainless steel. Therefore, the systems and methods disclosed herein provide for a bypass of the engine fluid from and/or a cooling of the engine fluid provided to the heat exchanger 122 in response to engine fluid operating temperatures. A bypass of engine fluid may also be performed in response to a fault condition with the waste heat recovery system, a contaminant condition in the engine fluid, or other condition. The heat exchanger 122 may also be bypassed during startup conditions when engine fluid temperatures are low to prevent condensation in the heat exchanger 122.

Figure 5:
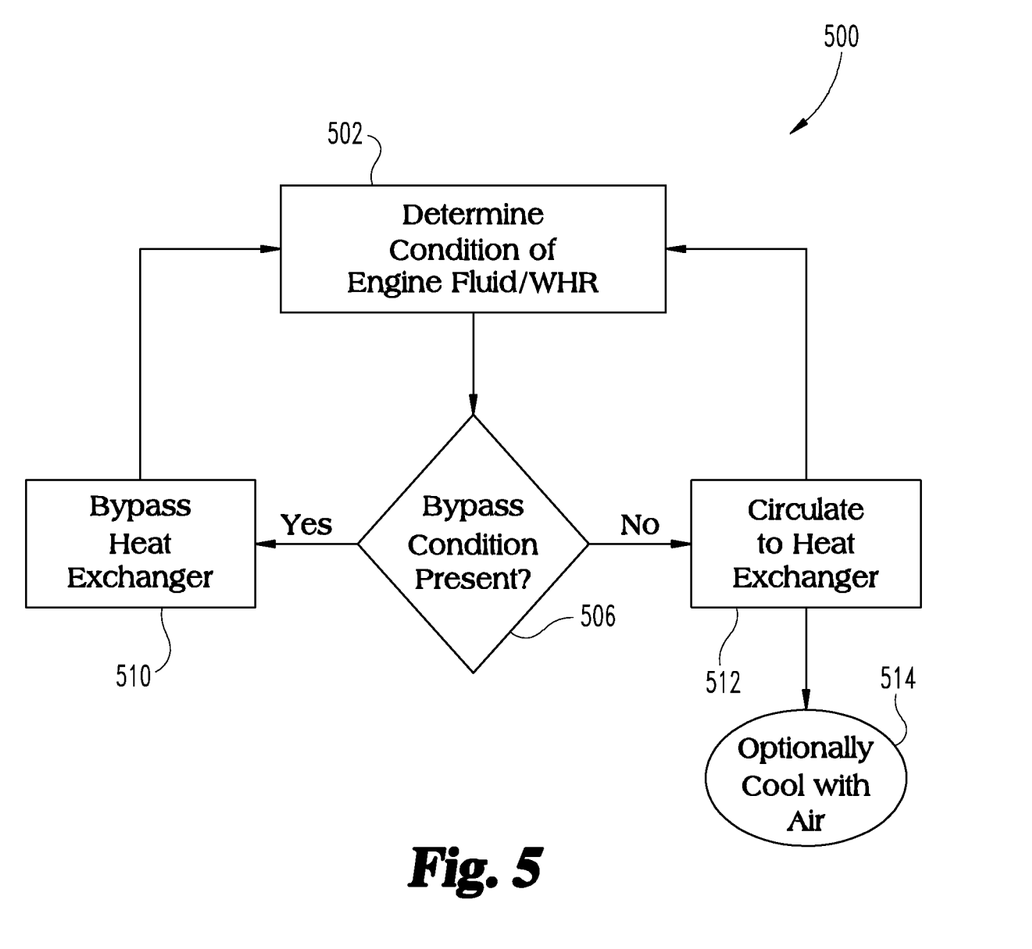
FIG. 5 is a flow diagram of one embodiment of a procedure for operating a waste heat recovery system of the present disclosure.

FIG. 5 is a flow diagram of one embodiment of a WHR process. Process 500 starts at operation 502 which determines a condition of the engine fluid. For example, the temperature of an engine fluid, the contaminant amount, or other parameter, such as the status of the WHR system or working fluid flow, can be determined. Based on the temperature of the engine fluid or other parameter determined at operation 502, conditional 506 determines if a heat exchanger bypass condition is present. For example, if the engine fluid temperature exceeds a predetermined threshold a bypass condition is present, procedure 500 continues at operation 510 and bypasses the heat exchanger 122, then returns to operator 502. If a bypass condition is not determined at conditional 506, procedure 500 continues at operation 512 and circulates the engine fluid through the heat exchanger. Procedure 500 may also include an operation 514 for cooling the engine fluid based on the temperature condition of the engine fluid before the engine fluid is passed through the heat exchanger. Procedure 500 returns to operation 502 from operation 512 and repeats.

The benefits of the heat exchanger 122 include the use of engine fluid heat in a WHR system while the heat exchanger 122 includes reduced component cost compared to traditional approaches of engine fluid heat collection. Engine fluid, such as exhaust, is a high-grade, high temperature heat source that can increase the fuel economy improvement of a WHR system. Using less expensive materials for the heat exchanger 122 may provide a shorter period for return on investment for a WHR system employing heat exchanger 122 than a system with a higher cost heat exchanger. For example, using aluminum for the heat exchanger structure allows significant weight savings and cost saving, which along with the increased efficiency of the engine and engine fluid temperature mitigation techniques disclosed herein may offset the reduced operational time periods in which the heat exchanger 122 may be employed.

Some waste heat sources to/from engine in the WHR system 100, 200, 300 may include engine fluids such as exhaust gas, EGR, coolant, charge air, engine oil or others. For example, a WHR system 100, 200, 300 may use tailpipe exhaust with the heat exchanger 122, and other engine waste heat sources may be in other arrangements with heat exchanger 122 such as series, parallel, and series-parallel arrangements, and the order of components in the system can be rearranged relative to what is shown in FIGS. 1-3. Also a recuperator could be included in the WHR working fluid loop to transfer heat from the turbine discharge gases to the liquid working fluid leaving the pump. This may be combined with, for example, a dual high side pressure WHR systems or other similar system to reduce the payback period for the system.

Various aspects of the present disclosure are contemplated. According to one aspect, a method includes recovering a waste heat from an engine fluid in a waste heat recovery system that includes a heat exchanger subsystem, where the heat exchanger subsystem is thermally coupled to a working fluid and the engine fluid, so the waste heat from the engine fluid is transferred to the working fluid; and bypassing the engine fluid from a heat exchanger of the heat exchanger subsystem in response to a heat exchanger bypass condition.

In one embodiment, the working fluid includes an exhaust of an engine and the bypass condition is a temperature condition of the exhaust exceeding a predetermined threshold. In another embodiment, the heat exchanger is constructed of a material that lacks thermal capability to operate effectively in response to engine fluid above a predetermined threshold. In a refinement of this embodiment, the material is an aluminum material.

In another embodiment, the engine fluid is bypassed by positioning of an exhaust valve upstream of the heat exchanger to direct the engine fluid away from the heat exchanger. In yet another embodiment, the heat exchanger is a tailpipe exhaust heat exchanger. In a refinement of this embodiment, the tailpipe exhaust heat exchanger comprises a low temperature section and a high temperature section upstream of the low temperature section. In a further refinement, the high temperature section is constructed of a first material capable of higher temperature operation than a second material that comprises the low temperature section.

In another embodiment, the engine fluid is at least one of an engine exhaust, a recirculated exhaust gas, a coolant, an engine oil, and a charge air. In yet another embodiment, the method includes air cooling the engine fluid upstream of the heat exchanger with air.

According to another aspect, a waste heat recovery system includes a heat exchanger subsystem configured to receive a waste heat from an engine fluid. The heat exchanger subsystem includes a heat exchanger configured to thermally couple a working fluid and the engine fluid to recover the waste heat. The system also includes a bypass valve configured to bypass the engine fluid from the heat exchanger in response to a bypass condition.

In one embodiment of the system, the bypass condition includes an engine exhaust temperature exceeding a predetermined threshold. In a refinement of this embodiment, the bypass condition includes the engine exhaust being less than a second predetermined threshold. In another embodiment, the heat exchanger is comprised of aluminum material.

In another embodiment of the system, the heat exchanger subsystem includes a low temperature heat exchanger and a high temperature heat exchanger upstream of the low temperature heat exchanger. In a refinement of this embodiment, the high temperature heat exchanger is configured to reduce a temperature of the engine fluid upstream of the low temperature heat exchanger.

In another embodiment, the bypass condition includes at least one of a flow rate of the working fluid being less than a threshold amount and a faulted state of the waste heat recovery system. In yet another embodiment, the system includes an air mixer configured to cool the engine fluid upstream of the heat exchanger. In a refinement of this embodiment, the air mixer includes at least one of a fan, an air injector, and an air entrainment device. In another refinement, the air mixer is connected with the bypass valve.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method comprising:
    recovering a waste heat from an engine fluid in a waste heat recovery system that includes a heat exchanger subsystem, wherein the heat exchanger subsystem is thermally coupled to a working fluid and the engine fluid, so the waste heat from the engine fluid is transferred to the working fluid, wherein recovering the waste heat includes first extracting a first portion of the waste heat of the engine fluid in a first heat exchanger of the heat exchanger subsystem and then extracting additional waste heat in a second heat exchanger of the heat exchanger subsystem, wherein the first heat exchanger is constructed of a first material capable of higher temperature operation than the second heat exchanger which is constructed only of a second material having a lower thermal capability than the first material; and bypassing the engine fluid from the first and second heat exchangers of the heat exchanger subsystem in response to a heat exchanger bypass condition, wherein the working fluid includes an exhaust of an engine and the bypass condition is a temperature condition of the exhaust exceeding a predetermined threshold.

2. The method of claim 1, wherein the first material is stainless steel and the second material is an aluminum material.

3. The method of claim 1, wherein the engine fluid is bypassed by positioning of an exhaust valve upstream of the second heat exchanger to direct the engine fluid away from the second heat exchanger.

4. The method of claim 1, wherein the first and second heat exchangers are tailpipe exhaust heat exchangers, the engine fluid is an engine exhaust that passes through an aftertreatment component, and the first and second heat exchangers are located downstream of the aftertreatment component.

5. The method of claim 1, wherein the engine fluid is at least one of an engine exhaust, a recirculated exhaust gas, a coolant, an engine oil, and a charge air.

6. The method of claim 1, further comprising air cooling the engine fluid upstream of the heat exchanger with air by mixing the air into the engine fluid to entrain the air in the engine fluid.

7. The method of claim 1, wherein the second heat exchanger is separate from and coupled to the first heat exchanger with an engine fluid passageway.

8. The system of claim 7, wherein the bypass valve is located in the engine fluid passageway.

9. A waste heat recovery system comprising:

a heat exchanger subsystem configured to receive a waste heat from an engine fluid, the heat exchanger subsystem including a first heat exchanger and a second heat exchanger configured to thermally couple a working fluid and the engine fluid to recover the waste heat, wherein the first heat exchanger extracts a first portion of the waste heat and the second heat exchanger extracts additional waste heat from the engine fluid received from the first heat exchanger, wherein the first heat exchanger is constructed of a first material capable of higher temperature operation than the second heat exchanger which is constructed only of a second material having a lower thermal capability than the first material; and a bypass valve configured to bypass the engine fluid from the first and second heat exchangers in response to a bypass condition, wherein the bypass condition includes an engine exhaust temperature exceeding a predetermined threshold.

10. The system of claim 9, wherein the bypass condition includes the engine exhaust temperature being less than a second predetermined threshold.

11. The system of claim 9, wherein the first heat exchanger is comprised of stainless steel and the second heat exchanger is comprised of aluminum material.

12. The system of claim 9, further comprising an aftertreatment component, wherein the first and second heat exchangers are tailpipe exhaust heat exchangers, the engine fluid is an engine exhaust that passes through the aftertreatment component, and the first and second heat exchangers are located downstream of the aftertreatment component.

13. The system of claim 9, wherein the bypass condition includes at least one of a flow rate of the working fluid being less than a threshold amount and a faulted state of the waste heat recovery system.

14. The system of claim 9, further comprising an air mixer configured to cool the engine fluid upstream of the heat exchanger and a venturi device for mixing and entraining air into the engine exhaust.

15. The system of claim 14, wherein the air mixer includes at least one of a fan, an air injector, and an air entrainment device.

16. The system of claim 14, wherein the air mixer is connected with the bypass valve.

17. The system of claim 9, wherein the second heat exchanger is separate from and coupled to the first heat exchanger with an engine fluid passageway.

18. The system of claim 17, wherein the bypass valve is located in the engine fluid passageway.

* * * * *